United States Patent
Travers

(10) Patent No.: US 12,018,645 B2
(45) Date of Patent: Jun. 25, 2024

(54) DEVICE FOR ALIGNING HOLES

(71) Applicant: General Electric Renovables Espana, S.L., Barcelona (ES)

(72) Inventor: Alexis Travers, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 0 days.

(21) Appl. No.: 18/356,270

(22) Filed: Jul. 21, 2023

(65) Prior Publication Data
US 2024/0026861 A1 Jan. 25, 2024

(30) Foreign Application Priority Data
Jul. 22, 2022 (EP) ..................... 22382708

(51) Int. Cl.
*B23P 19/12* (2006.01)
*B25B 27/16* (2006.01)
*F03D 13/20* (2016.01)
*F03D 13/10* (2016.01)

(52) U.S. Cl.
CPC ............ *F03D 13/205* (2023.08); *B23P 19/12* (2013.01); *B25B 27/16* (2013.01); *F03D 13/112* (2023.08); *F03D 13/20* (2016.05); *F03D 13/201* (2023.08); *F05B 2230/604* (2013.01); *Y10T 29/4978* (2015.01); *Y10T 29/53913* (2015.01)

(58) Field of Classification Search
CPC ............. B23P 19/12; Y10T 29/4978; Y10T 29/53913; F05B 2230/604; F03D 13/112; F03D 13/201; F03D 13/205; B25B 27/16
See application file for complete search history.

(56) References Cited

U.S. PATENT DOCUMENTS

| | | | | | |
|---|---|---|---|---|---|
| 2,615,413 | A | * | 10/1952 | Adams | B23K 37/0531 269/34 |
| 2,963,090 | A | * | 12/1960 | Focht | E21B 23/00 166/241.1 |
| 3,031,995 | A | * | 5/1962 | Taylor, Jr. | B23K 37/0531 269/48.1 |
| 3,742,186 | A | * | 6/1973 | Finkel | B23K 37/0531 219/160 |
| 5,067,696 | A | * | 11/1991 | Morley | B25B 5/10 269/49 |

(Continued)

FOREIGN PATENT DOCUMENTS

| | | |
|---|---|---|
| EP | 1452758 A1 | 9/2004 |
| EP | 2748460 B1 | 6/2015 |

(Continued)

*Primary Examiner* — Jermie E Cozart
(74) *Attorney, Agent, or Firm* — Dority & Manning, P.A.

(57) ABSTRACT

The present disclosure is related to a device 100 configured for aligning a first hole 131 of a first flange 130 with a second hole 141 of a second flange 140. The device 100 comprises a base 101, a shaft 110 extending from the base 101 and a first and a second pusher 115, 116. The shaft 110 is configured to move between a retracted position and an extended position. The shaft 110 in the extended position extends from the first hole 131 into the second hole 141. The first and second pushers 115, 116 are also configured to be moved radially outwardly from the shaft 110 to exert pressure against an inner wall of the first and second holes 131, 141. Methods for aligning a first and a second hole 130, 140 are also provided.

15 Claims, 5 Drawing Sheets

(56) References Cited

U.S. PATENT DOCUMENTS

| | | | | |
|---|---|---|---|---|
| 5,123,812 | A | * | 6/1992 | Groenendaal, Jr. ... F01D 25/246 415/126 |
| 5,170,551 | A | * | 12/1992 | Norberg .................... F16B 5/02 29/523 |
| 8,763,221 | B1 | * | 7/2014 | Boss ..................... B25B 27/023 29/239 |
| 2008/0080946 | A1 | * | 4/2008 | Livingston ............ F16B 5/0258 411/533 |
| 2010/0307097 | A1 | * | 12/2010 | Word, III .............. E04H 12/085 52/651.07 |
| 2015/0224611 | A1 | * | 8/2015 | Wojciechowski ...... B25B 27/16 29/256 |
| 2017/0182643 | A1 | * | 6/2017 | Guering .................... B64F 5/10 |
| 2023/0032745 | A1 | | 2/2023 | Berque et al. |

FOREIGN PATENT DOCUMENTS

| | | |
|---|---|---|
| KR | 101383477 B1 | 4/2014 |
| WO | WO2021144433 A1 | 7/2021 |

\* cited by examiner

DEVICE FOR ALIGNING HOLES

FIELD

The present disclosure relates to devices for aligning holes. More precisely, the present disclosure relates to devices configured for aligning two holes of respective flanges. The present disclosure further relates to methods and systems for aligning two flanges and joining one flange with another flange, and specifically for joining a flange of a tower section to a flange of another tower section. The present disclosure further related to joining flanges of tower sections of a wind turbine tower.

BACKGROUND

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. This rotation generates a torque that is normally transmitted through a rotor shaft to a generator, either directly ("directly driven" or "gearless") or through the use of a gearbox. This way, the generator produces electricity which can be supplied to the electrical grid.

Wind turbines have evolved rapidly over the last decades with a clear trend of increasing size. The power generated by a wind turbine is proportional to the rotor swept area and, therefore to the square of the blade length. Thus, higher towers and longer blades have been used with the goal of extracting more energy from the wind, leading to a higher electricity production. The increase in size over the years has led to a substantial increase in the loads acting on wind turbine components, and has posed new challenges for a wide range of disciplines including mechanical, electrical, materials and civil engineering among others.

Modern tall wind turbines have large tubular towers configured to withstand the increased loads. To do so, tubular towers may be manufactured in substantially tubular sections that have thicker walls and larger diameters. In some cases, tubular sections may be made from several segments attached to each other. These bigger components also result in a more complex and expensive assembly process. Although tower sections may herein generally be described as tubular, it should be clear that the tower sections may be substantially cylindrical (of constant diameter or constant cross-sectional dimensions) or conical, wherein the diameter or cross-sectional dimensions at a lower end of the tower section are greater than at the upper end of the section.

Typically, the tower sections may be made from concrete or from steel. A section may include a flange at a bottom end (for joining to a lower tower section or a foundation) and a flange at an upper end of the section (for joining to a higher tower section or to a yaw bearing). These flanges can be combined with fasteners such as studs, bolts or rods to achieve a secure connection between adjacent tower sections. In order to further facilitate the mounting process of the tower, it is important to maintain tubular sections of substantially circular cross-section, thus matching the geometry of the tubular section counterpart where they will be connected. The holes for the fasteners joining one flange to another may thus be better aligned with the holes on the other flange. Proper alignment can reduce stresses in the fasteners.

Despite the manufacturing efforts to generate tubular sections with circular cross-section, long periods of storage may lead to large and sustained forces acting on the section due to the tower section's own weight. In fact, it has been found that the weight force of the section itself can lead to an ovalization of the circular section, including the flange.

Deformation of the tower section can result in misalignment. This can not only lead to increased tension on the fasteners but can also hinder the tower mounting process, extending it in time and making it more expensive.

Generally, heavy mobile cranes are used for erecting wind turbines comprising prefabricated tubular sections. Mobile cranes of this type are relatively expensive; therefore it is of interest to reduce the time that these cranes are used for a given wind turbine. Further, due to health and safety reasons, known methods for erecting wind turbines generally require the presence of personnel inside a tower as subsequent sections are mounted. Thus, devices and associated methods that ease the installation of wind turbine tubular sections remotely are also welcomed in the art.

The present disclosure provides methods and systems to at least partially overcome some of the aforementioned drawbacks.

SUMMARY

In an aspect of the present disclosure, a device for aligning a first hole of a first flange with a second hole of a second flange is provided. The device comprises a base, a shaft extending from the base, and a first and a second pusher. The shaft is configured to move between a retracted position and an extended position. The shaft extends from the first hole into the second hole in the extended position. Further, when the shaft is in the extended position, the first and second pushers are configured to be positioned in the first and second holes, respectively. The first and second pushers are also configured to be moved radially outwardly from the shaft to exert pressure against an inner wall of the first and second holes, respectively.

According to this aspect, the fact that the device comprises a first and a second pusher configured to be positioned in the first and second holes can provide a precise alignment of the first and second holes of the flanges. In fact, the first and second pushers also align the device relative to the first and second holes and therefore a pre-alignment between the device and the first hole is not required. Thus, coupling flanges, i.e. while erecting a wind turbine tower structure, is greatly simplified. This leads to a reduction in time during installation and allows a remote and convenient aligning process.

In an additional aspect, a method for aligning a first hole of a first flange with a second hole of a second flange is disclosed. The method comprises attaching a base of a device to the first flange, such that a shaft of the device extends into the first hole of the first flange. The shaft of the device comprises a first pusher, and a second pusher. Further, the method comprises extending the shaft through the first hole and into the second hole such that the first pusher is positioned inside the first hole, and the second pusher is positioned inside the second hole. The method also comprises moving radially outwards the first and second pushers from the shaft, such that the first and second pushers exert pressure against an inner wall of the first and second holes, respectively According to this additional aspect, the alignment between two flanges can be improved. The shaft can be moved into the first and second holes even though these may not be completely aligned, i.e. the overlap between holes should be greater than the thickness of the shaft. Further, the alignment can be enhanced by means of the first and second pushers. The alignment between holes from the first flange and the corresponding holes from the second flange may be also improved and therefore the coupling process may be simplified, and the overall installation time may be reduced.

Thus, when this device and this method are used for the installation of wind turbine components, the use of cranes, or any other lifting equipment, may be more efficient than in previous methods, and the assembly process may thus be faster and cheaper.

Throughout the present disclosure, the term "align" should be understood as to bring two or more components into a line. For example, two or more holes can be aligned by bringing the central point or central axis of each of the holes into a line. The holes may be similarly shaped and sized in some examples, and alignment thus achieves that the holes substantially match each other.

In the disclosure, a pusher may be regarded as any element suitable for applying pressure towards an inside surface of a hole, either actively or passively. The pusher may be configured as one or more clamps, wedges, or other suitable elements.

Throughout this disclosure, the term coefficient of friction should be understood as the ratio of the frictional force resisting the motion of two surfaces that are in contact to the normal force pressing the two surfaces together. Unless otherwise stated, the coefficient of friction used refer to static coefficient of friction, i.e. prior to starting a relative motion between the two surfaces. When referring to "low friction materials" and "high friction materials", it should be understood that these terms refer to materials for which the resulting coefficient of friction with a broad range of materials is generally low, i.e. below 0.5, or high, i.e. above 0.5.

Additional objects, advantages and features of embodiments of the present disclosure will become apparent to those skilled in the art upon examination of the description, or may be learned by practice.

DETAILED DESCRIPTION OF EXAMPLES

Figure 1:
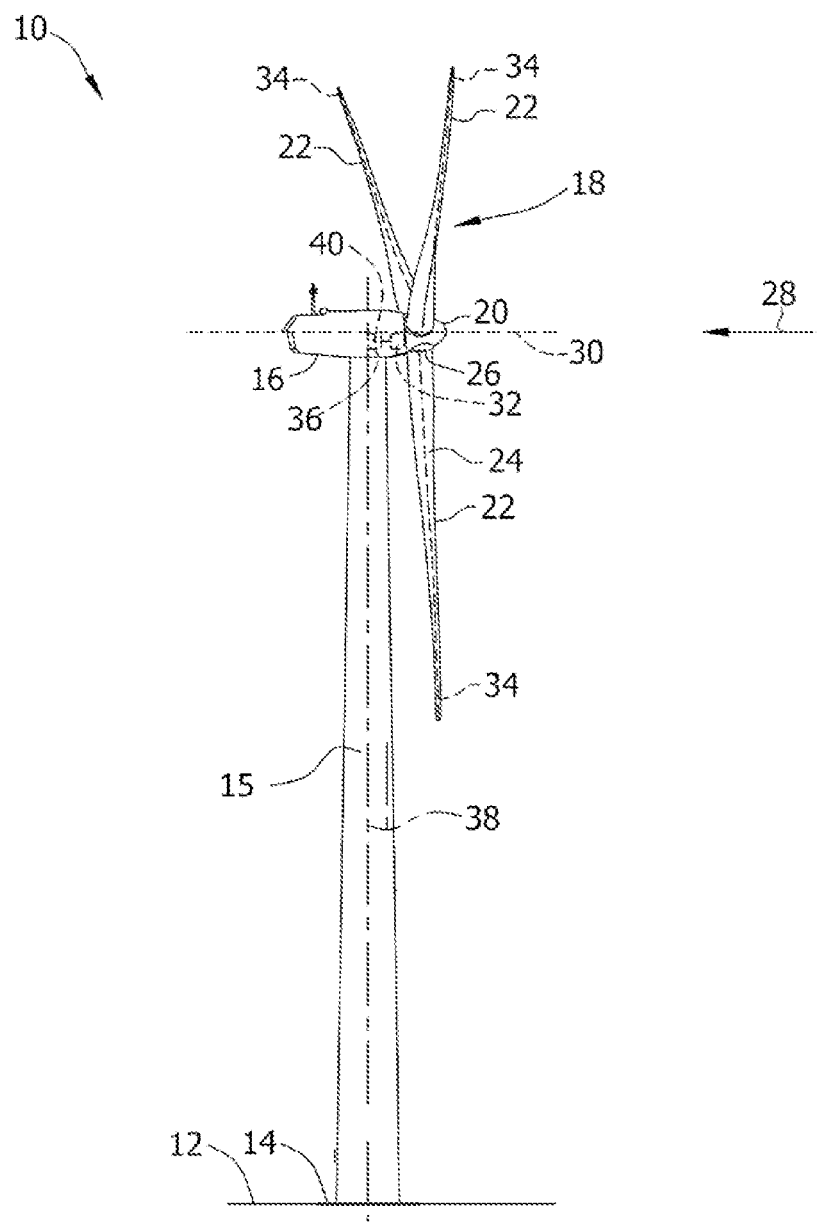
FIG. 1 schematically illustrates a perspective view of one example of a wind turbine.

Reference now will be made in detail to embodiments of the disclosure, one or more examples of which are illustrated in the drawings. Each example is provided by way of explanation, not as a limitation. In fact, it will be apparent to those skilled in the art that various modifications and variations can be made in the present disclosure without departing from the scope or spirit of the teaching. For instance, features illustrated or described as part of one embodiment can be used with another embodiment to yield a still further embodiment. Thus, it is intended that the present disclosure covers such modifications and variations as come within the scope of the appended claims and their equivalents.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
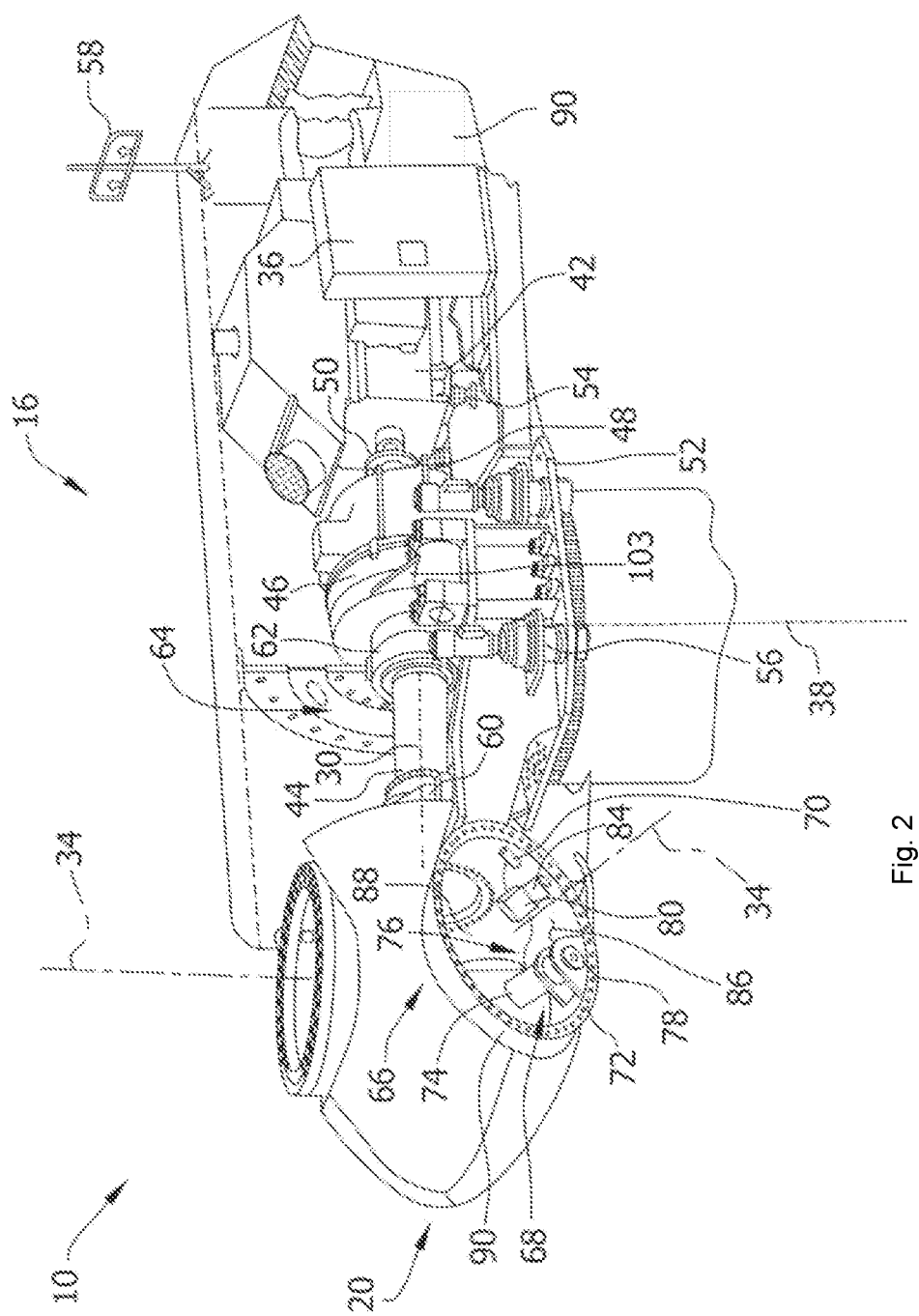
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 may also include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system 58 which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angle of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer roof surface of hub 20 and may be coupled, directly or indirectly, to the outer roof surface.

Figure 3:
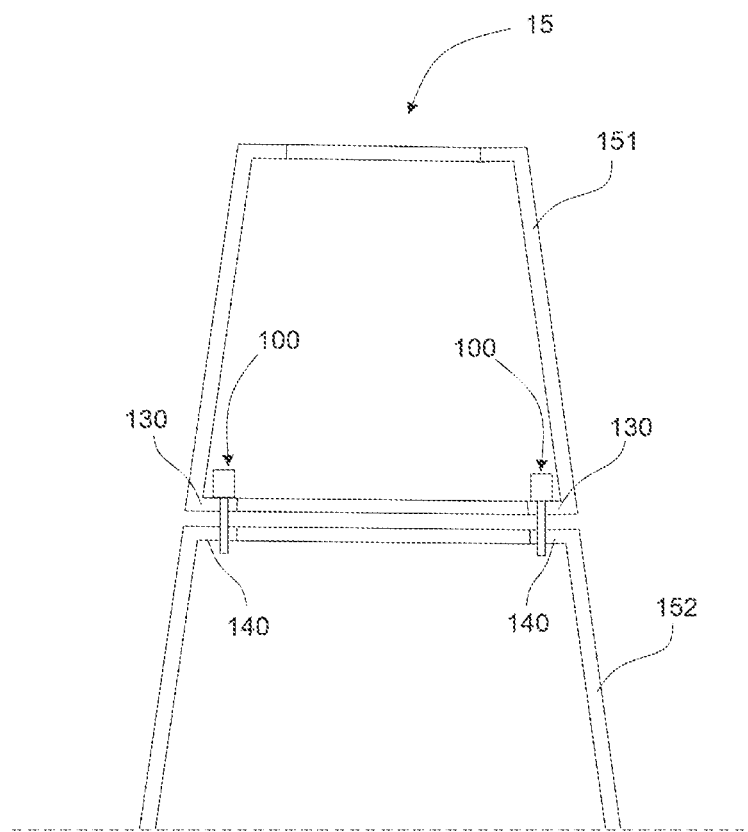
FIG. 3 schematically illustrates a cross-section of a wind turbine tower being erected with a device according to the present disclosure at a flange.

FIG. 3 illustrates a schematic cross-sectional view of a wind turbine tower 15 being erected. In particular, FIG. 3 shows two tower sections 151, 152 of conical shape comprising mounting flanges 130, 140. In the example, the upper tower section 151 comprises a lower mounting flange 130 that has been substantially aligned with the upper mounting flange 140 of the lower tower section 152. Two devices 100 configured for aligning holes of the mounting flanges have been illustrated in the schematic cross-sectional view, but other number of devices 100 may be used for this purpose. Also, the devices 100 may be used with other types of tower sections such as tower sections with circular cross-section with substantially constant diameter. Note that the cut surfaces in FIG. 3 have not been illustrated with oblique lines for reasons of simplicity.

Figure 4:
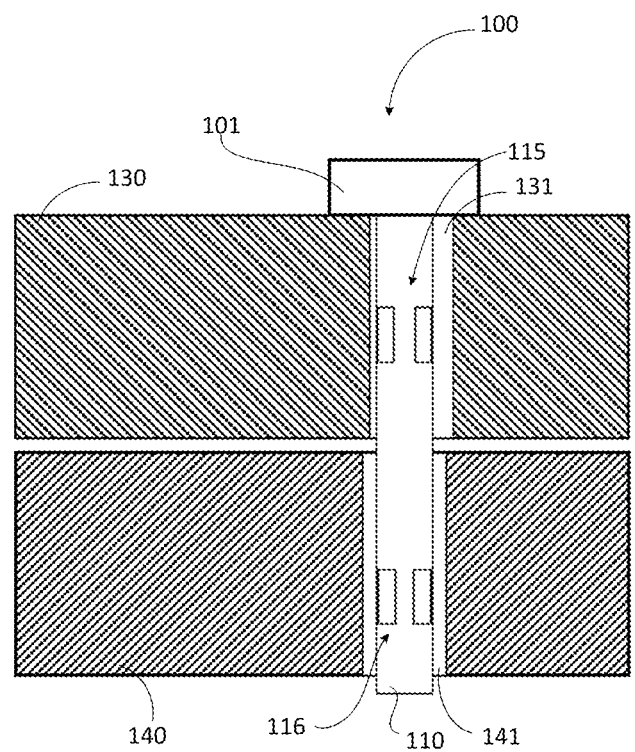
FIG. 4 schematically illustrates a cross-sectional view of two flanges with an example device according to the present disclosure in a first position.
Figure 5:
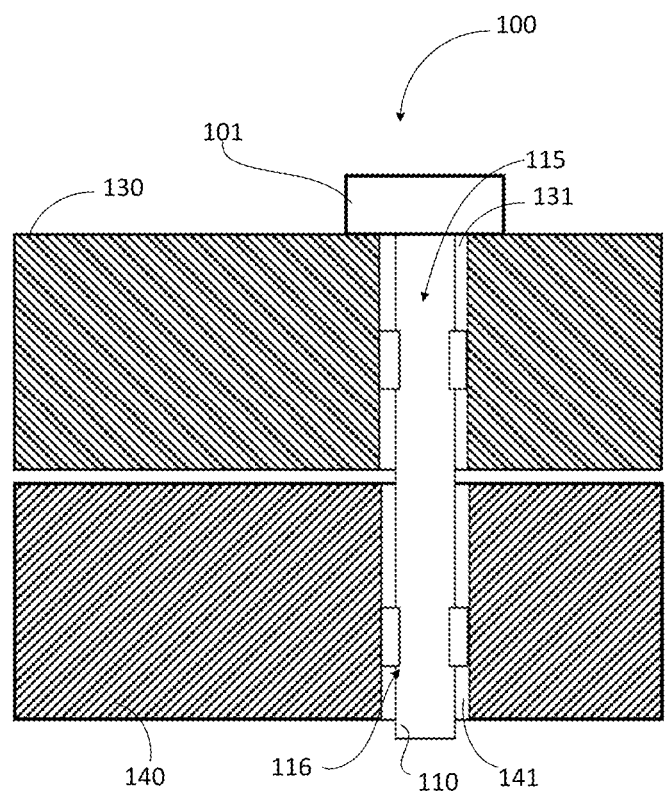
FIG. 5 schematically illustrates a cross-sectional view of two flanges with an example device according to the present disclosure in a second position.
Figure 6:
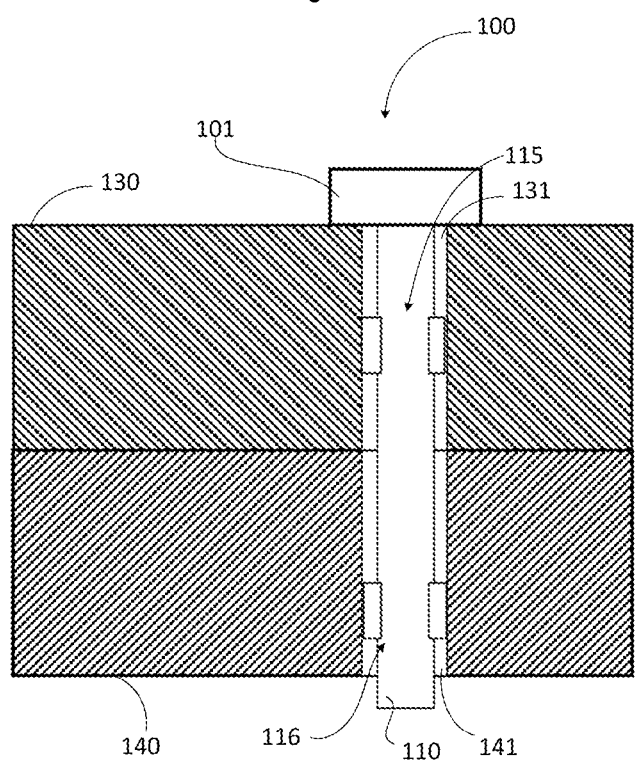
FIG. 6 schematically illustrates a cross-sectional view of two flanges with an example device according to the present disclosure in a third position.

FIGS. 4 to 6 illustrate in more detail the working principle of the devices 100 illustrated in FIG. 3.

FIG. 4 illustrates a schematic cross-sectional view of two flanges with a device 100 according to an example of the present disclosure in a first position. The device 100 is configured for aligning a first hole 131 of a first flange 130 with a second hole 141 of a second flange 140. The device 100 comprises a base 101, a shaft 110 extending from the base 101 and a first and a second pusher 115, 116. The shaft 110 is configured to move between a retracted position and an extended position. The shaft 110, in the extended position, extends from the first hole 131 into the second hole 141. Further, when the shaft 110 is in the extended position, the first and second pushers 115, 116 are configured to be positioned in the first and second holes 131, 141, respectively. The first and second pushers 115, 116 are also configured to be moved radially outwardly from the shaft 110 to exert pressure against an inner wall of the first and second holes 131, 141, respectively. This aspect will be discussed in more detail in relation to FIGS. 5 and 6.

The base 101 may be attached to the first flange 130. Thus, in some examples the base 101 may comprise fastening elements to connect the base 101 with the first flange 130. The fastening elements may be threaded elements, clamping elements or other.

As can be seen in the example of FIG. 4, the pushers 115, 116 may be located at least partially inside the shaft 110 when these are not activated, i.e. prior and during shaft 110 insertion into the first and second holes 131, 141. Thus, the diameter of the shaft 110 is reduced, and it allows insertion with a relatively large misalignment between holes 131, 141. In FIG. 4, the device is in an extended position, i.e. the shaft 110 is at least partially introduced in the first and second holes 131, 141.

It is noted that the base 101 in this example has been schematically illustrated in FIG. 4. The base 101 may be shaped and dimensioned differently, i.e. it may be dimensioned such that to comprise other device components within. For example, the base 101 may comprise a rim for attaching the device to the first flange 130. In examples, the rim may have a cross-section substantially greater than the cross-section of the shaft so that the stability of the device 100 over the flange 130 is enhanced. In some examples, the base 101 may comprise an actuator assembly to actuate at least one of the shaft 110 and the first and second pushers 115, 116.

In examples, the actuator assembly may comprise one or more of a pneumatic actuator, a hydraulic actuator, an electric actuator, a stepper motor, a rotary actuator, or a combination of actuators. For example, the actuator assembly may comprise a pneumatic or hydraulic actuator to move the shaft 110 between a retracted position and an extended position. Further, in examples the actuator assembly may comprise another actuator that displaces a body longitudinally along the shaft to move the first and second pushers 115, 116 against the inner wall of the respective holes 131, 141.

In examples, the device 100 may comprise a receiver or a receiver unit and a controller. A receiver unit may be configured to receive signals a remote control. The receiver unit may be configured to receive signals from a remote control device. Said device may be other device for aligning e.g. a third and a fourth hole of the flanges. Additionally, said device may be other type of device, such as a master controller or an interphase device for transmitting information to operators. Further, the controller may be configured to operate the actuator assembly in accordance with the received signals.

FIG. 5 is a schematic cross-sectional view of two flanges with the device according to the example of FIG. 4 in a second position. In FIG. 5, the first and second pushers 115, 116 have been radially moved outwardly from the shaft 110. The pushers 115, 116, contact the inner wall of the holes 131, 141 and exert pressure against an inner wall of the respective first and second holes 131, 141. Thus, when the pushers 115, 116 are activated the radial gap between the shaft 110 and the inner walls of the holes 131, 141 is modified, and the holes 131, 141 are aligned. In some examples, when the shaft 110 and the holes 131, 141 are cylindrical the pushers 115, 116 may create a nearly uniform radial gap between the inner wall of the holes 131, 141 and an outer surface of the shaft 110.

Further, FIG. 5 illustrates that the pushers 115, 116 may be a plurality of wedges. The pushers may particularly be a pair of diametrically opposed elements, such as wedges. In other examples, the pushers may comprise a pair of substantially semi-circular components or other elements. The pushers 115, 116, i.e. wedges, may be connected to the actuator assembly previously disclosed. Thus, the pushers 115, 116, when moved radially, may overcome the resistance originated from the weight of the flanges 130, 140 and friction of the flanges with adjacent elements. In examples, the pushers 115, 116 and associated actuator may be configured to cause a local deformation of the flanges 130, 140 over which they are acting. The pushers 115, 116 may therefore successfully align the first and second holes 131, 141 as previously disclosed.

As can be seen in FIG. 5, once the pushers 115, 116 have been deployed, the first and second holes 131, 141 of the respective flanges 130, 140 will be aligned.

The pushers 115, 116 may be made of a material with high mechanical properties, i.e. with sufficient strength to overcome the lateral resistance of the flange, i.e. move laterally the flanges or overcome a certain level of ovalization of the flanges that may have taken place, and optionally without incurring plastic deformation. In examples, the pushers 115, 116 may be made of metal or metal alloys, i.e. stainless steel.

FIG. 6 is a schematic cross-sectional view of two flanges with an example device according to the present disclosure in a third position. As shown in FIG. 6, the two flanges 130, 140 are in contact. This may be achieved by at least partially moving the shaft 110 from an extended position to a retracted position. In the illustrated example, the shaft 110 has been moved to a retracted position, i.e. pulled into the base 101. Further, the first pusher 115 may be configured to slide along the inner wall of the first hole 131 when the shaft 100 is moved from the extended position towards the retracted position. In addition, the second pusher 116 may be configured to be substantially fixed relative to the inner wall of the second hole 141. Thus, a relative motion between the first flange 130 (slidably coupled to the first pusher 116 and shaft 110) and the second flange 140 (firmly coupled to the second pusher 116 and shaft 110) is promoted. The flanges may thus be secured to each other in this manner.

In examples, the first flange 130 may be a mounting flange of an upper tower section 151 and the second flange 140 may a mounting flange of a lower tower section 152. As illustrated in FIG. 3, during tower erection, the upper tower section 151 may be held by a crane (not illustrated) or any other type of lifting equipment. Then, when a shaft 110 of the device(s) 100 extends from a first hole of one of the mounting flanges 130, 140 to another hole of the other of the mounting flanges 130, 140, and the mounting flanges 130, 140 are substantially aligned (and optionally secured, as illustrated in FIG. 6), the crane may be removed. Thus, the fastening of the flanges 130, 140 may finalize without the crane being used. The same reasoning also applies for any other lifting equipment that may be used during tower erection.

In another example, the first pusher 115 may be configured to slide along the shaft 110 when the shaft 100 is moved from the extended position towards the retracted position. Further, the second pusher 116 may be configured to be substantially fixed relative to the inner wall of the second hole 141. Thus, a relative motion between the first flange 130 (slidably coupled to the shaft 110) and the second flange 140 (firmly coupled to the shaft 110) is promoted.

To promote a relative motion between the first flange 130 and the second flange 140, the coefficient of friction between the surface of the inner wall of the first hole 131 and outer surface of the first pusher 115 may be lower than the coefficient of friction between the surface of the inner wall of the second hole 141 and the second pusher 116. In examples, the coefficient of friction between the surface of the inner wall of the first hole 131 and outer surface of the first pusher 115 may be below 0.5, specifically below 0.35 and more specifically below 0.2. This may be achieved by the selecting appropriate pair of materials for the inner wall of the first hole 131 and the first pusher 115, by using a suitable material, or a dedicated outer skin or coating to cover contact surfaces, or by including lubrication. For example, the first pusher 115 may be made of stainless steel with an outer skin of Polyethylene or Polytetrafluoroethylene (PTFE) and the inner wall of the first hole 131 may be made of stainless steel. This combination of materials would lead to an approximate coefficient of friction of between 0.2 and 0.1. Further, the use of a low friction material, i.e. a material that has a low coefficient of friction with a broad range of materials, may be used for at least one of the first pusher 115, and first hole 131. In addition, the inner wall of the first hole 131 and the outer surface of first pusher 115 may be treated such that a relatively smooth surface finished is achieved. Further, these and other combination of materials could be used in combination with liquid or solid lubrication, such as vegetable oils, mineral oils, synthetic liquid lubricants, graphite, molybdenum disulfide or boron nitride among others.

In examples, to promote a firm contact point between the second pusher 116 and the inner wall of the second hole 141, the coefficient of friction between these elements may be above 0.7, specifically above 0.8 and more specifically above 1. As previously discussed, this may be achieved by selecting appropriate pair of materials. For example, steel or aluminum alloys for both elements. Further, the use of a high friction material, i.e. a material that has a high coefficient of friction with a broad range of materials, may be used for at least one of the second pusher 116, and second hole 141. Additionally, the overall friction that may be experienced between the inner wall of the second hole 141 and the second pusher 116 may be also enhanced by an irregular surface finished, i.e. a rough wall, a pusher with a serrated surface or others.

Figure 7:
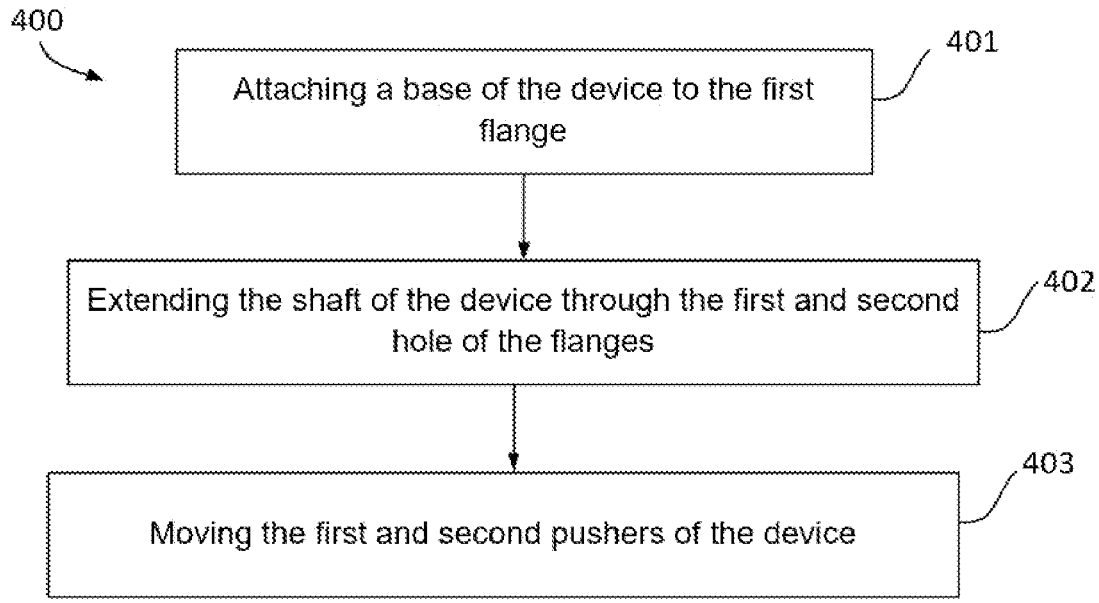
FIG. 7 shows a flowchart of an example of a method aligning a first hole of a first flange with a second hole of a second flange.
Figure 8:
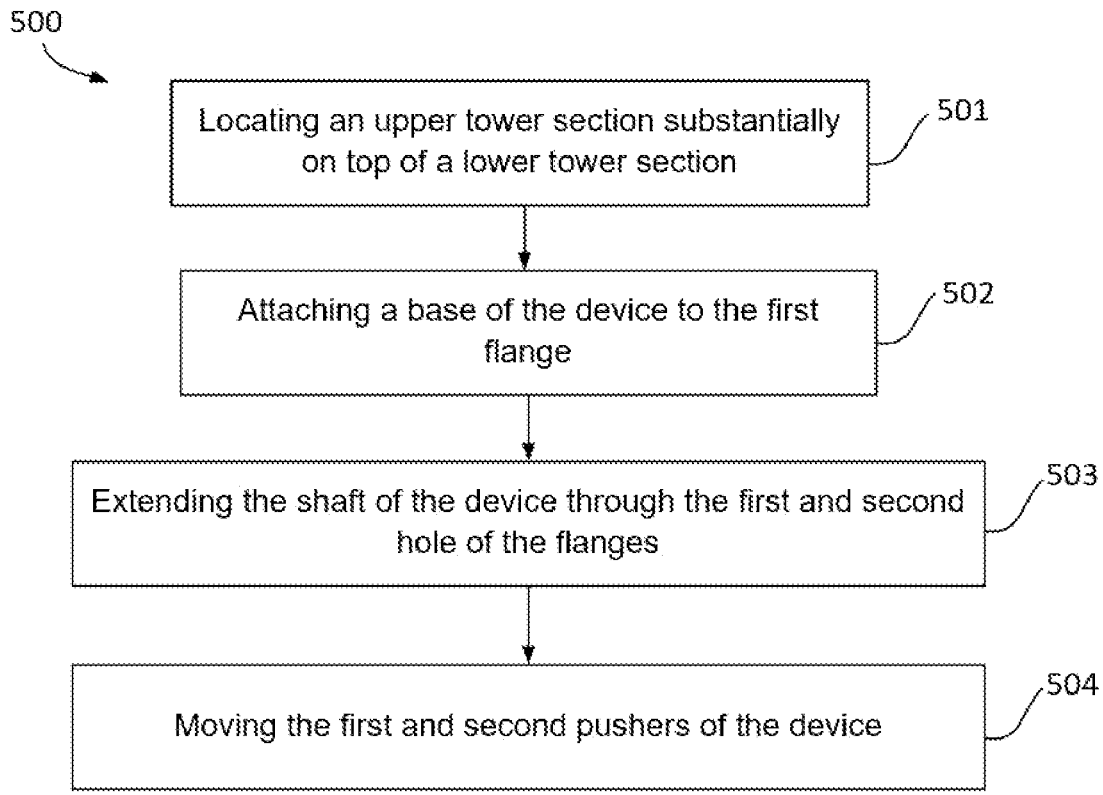
FIG. 8 shows a flowchart of an example of a method for erecting a wind turbine tower comprising more than one tower sections.

In another aspect of the disclosure, a method 400 is disclosed. Method 400 is suitable for aligning a first hole 131 of a first flange 130 with a second hole 141 of a second flange 140. Method 400 is schematically illustrated in FIG. 7.

The method 400 comprises, at block 401, attaching a base 101 of a device 100 to the first flange 130, such that a shaft 110 of the device 100 extends into the first hole 131 of the first flange 130, wherein the shaft 110 comprises a first pusher 115, and a second pusher 116.

The method 400 also comprises, at block 402, extending the shaft 110 through the first hole 131 into the second hole 141 such that the first pusher 115 is positioned inside the first hole 131, and the second pusher 116 is positioned inside the second hole 141.

The method 400, at block 403, comprises moving the first and second pushers 115, 116 radially outwards from the shaft 110 to press against an inside of the first hole 131 and second hole 141, respectively. This step allows aligning the first hole 131 with the second hole 141.

In examples, the method 400 may comprise retracting the shaft 110 of the device 100, such that a relative motion between the first flange 130 and the shaft 110 is greater than a relative motion between the second flange 140 and the shaft 110. This may be achieved by the sliding of the first pusher 115 relative to the shaft 110 or to the inner wall of the first hole 131, as discussed in relation to FIG. 6.

Further, in examples, the method 400 may comprise fastening the first flange 130 to the second flanges 140 together.

In this aspect, the first flange 130 in method 400 may be a lower mounting flange of a first tower section 151 of a wind turbine tower 15, and the second flange 140 may be an upper mounting flange of a second tower section 152 of the wind turbine tower 15. This example configuration has been illustrated in FIG. 3.

In some examples, the method 400 may further comprise hoisting the first tower section 151 above the second tower section 152 and positioning the first tower section 151 with respect to the second tower section 152 using a camera system attached to the first or second tower section 151, 152. Thus, the device 100 may receive signals comprising information from the camera system to move the shaft 110 from a retracted position to an extended position, and vice versa.

In examples, the first and second holes 131, 141 may be centering holes, and the first and second flanges 130, 140 may further comprise fastening holes.

In another aspect, a method 500 for erecting a wind turbine tower 15 comprising a plurality of tower sections 151, 152 is disclosed. Each tower section 151, 152 of method 500 comprises at least one mounting flange 130, 140. The method 500 comprises, at block 501, positioning an upper tower section 151 substantially on top of a lower tower section 152, such that an upper mounting flange 140 of the lower tower section 152 is substantially aligned with a lower mounting flange 130 of the upper tower section 151 wherein one of the lower mounting flange 140 and upper mounting flange 130 of the respective tower sections 152, 151 carries an alignment device 100 with a shaft 110, and the shaft 110 comprises a first pusher 115, and a second pusher 116. Further, the method 500 comprises, at block 502, extending the shaft 110 of the alignment device 100 through a first hole 130 of one of the upper or lower mounting flange 130, 140 into a second hole 140 of the other of the upper or lower mounting flange 130, 140, such that the first pusher 115 is positioned inside the first hole 131, and the second pusher 116 is positioned inside the second hole 141.

The method 500 also comprises, at block 503, moving the first and second pushers 115, 116 radially outwards to press against an inside of the first hole 131, and an inside of the second hole 141 respectively, to align the first hole 131 with the second hole 141.

The method 500 reduces time during installation of wind turbine tower sections due to the relative simplicity of the alignment process; the flanges 130, 140, which may have been subjected to geometric modifications during storage can be made coincident easily and without the presence of operators onsite. Further, this method 500 also allows reducing the time spent by the crane during each tower section connection and therefore reduces the overall cost of the assembly process.

In examples, the positioning step at block 501 comprises lifting the upper tower section 151 with a lifting equipment such as a crane, wherein extending 502 the shaft 110 and moving 503 the first and second pushers 115, 116 radially outwards are carried out while the crane substantially supports the upper tower section 151.

In some examples, the method 500 may comprise removing the crane once the device 100 has aligned the first hole 131 with the second hole 141. In additional examples, the method 500 may further comprise fastening the upper and lower mounting flanges 130, 140 together. Fastening the mounting flanges may take place after the crane is no longer lifting the tower section.

In examples, the connection with the crane may be removed after the flanges of the tower sections have been forced into contact with each other. I.e. after retracting the shaft of the device such that a relative motion between the first flange and the shaft is greater than a relative motion between the second flange and the shaft.

In examples, the alignment device 100 is attached to an upper tower section 151 before hoisting the upper tower section 151. Note that the device 100 may be attached to the upper flange (from below) or to the lower flange (from above) depending on mounting preferences with respect to adjacent tower sections.

In some examples, a camera system may be attached to the upper tower section 151 before hoisting the upper tower section 151. The camera system may be used to aid in positioning the upper tower section 151 with respect to an adjacent tower section. For example, it may be used to aid in positioning the upper tower section 151 with respect to the lower tower section 152 and/or in positioning the upper tower section 151 with respect to a tower section that may be subsequently positioned above the upper tower section 151.

It is noted that all features of the device 100 can be included in methods 400, 500 suitable for aligning a first hole 131 of a first flange 130 with a second hole 141 of a second flange 140, and vice versa.

This written description uses examples to disclose the teaching, including the preferred embodiments, and also to enable any person skilled in the art to practice the teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. A method for aligning a first hole of a first flange with a second hole of a second flange using a device that includes a base, a retractable shaft extending from the base, and a first and a second pusher configured on the shaft, the method comprising:
   attaching the base of the device to the first flange such that the shaft extends into the first hole of the first flange;
   extending the shaft through the first hole and into the second hole such that the first pusher is positioned inside the first hole and the second pusher is positioned inside the second hole;
   moving the first and second pushers radially outwards from the shaft to press against an inside of the first hole and an inside of the second hole, respectively, to align the first hole with the second hole; and
   retracting the shaft such that a relative motion between the first flange and the shaft is greater than a relative motion between the second flange and the shaft in order to draw the first and second flanges together.

2. The method of claim 1, further comprising sliding the first pusher along the inner wall of the first hole as the shaft is retracted.

3. The method of claim 1, wherein the first flange is a lower mounting flange of an upper tower section of a wind turbine tower, and the second flange is an upper mounting flange of a lower tower section of the wind turbine tower.

4. The method of claim 3, wherein the first and second holes are centering holes, and the first and second flanges further comprise fastening holes.

5. The method of claim 3, further comprising:
hoisting and positioning, using a lifting equipment, the upper tower section substantially on top of the lower tower section such that the upper mounting flange of the lower tower section is substantially aligned with the lower mounting flange of the upper tower section; and
wherein the extending of the shaft and the moving of the first and second pushers are carried out while the lifting equipment substantially supports the upper tower section.

6. The method of claim 5, further comprising removing the lifting equipment once the device has aligned the first hole with the second hole, and subsequently fastening the first and second flanges together.

7. The method of claim 5, wherein the device is attached to the upper tower section before hoisting the upper tower section.

8. A device for aligning a first hole of a first flange with a second hole of a second flange, the device comprising:
a base;
a shaft extending from the base;
a first pusher and a second pusher configured on the shaft;
the shaft configured to move between a retracted position and an extended position where the shaft extends from the first hole into the second hole, wherein the first pusher is positioned in the first hole and the second pusher is positioned in the second hole when the shaft is in the extended position;
the first and second pushers configured to be moved radially outwardly from the shaft to exert pressure against an inner wall of the first and second holes, respectively, in the extended position of the shaft; and
wherein the first pusher is further configured to slide along the inner wall of the first hole or along the shaft, and the second pusher is configured to be fixed relative to the inner wall of the second hole when the shaft is moved from the extended position towards the retracted position such that a relative motion between the first and second flanges is promoted.

9. The device of claim 8, wherein the first pusher and the second pusher comprise an outer surface, and wherein a coefficient of friction between the outer surface of the first pusher and the inner wall of the first hole is lower than a coefficient of friction between the outer surface of the second pusher and the inner wall of the second hole.

10. The device of claim 8, wherein the base comprises a rim for attaching the device to the first flange.

11. The device of claim 8, wherein at least one of the first and second pushers comprises a pair of diametrically opposed wedges.

12. The device of claim 8, further comprising an actuator in the base configured to actuate at least one of the shaft between the retracted and extended positions or the first and second pushers radially relative to the shaft.

13. A method for aligning a first hole of a first flange with a second hole of a second flange using a device that includes a base, a retractable shaft extending from the base, and a first and a second pusher configured on the shaft, the method comprising:
attaching the base of the device to the first flange such that the shaft extends into the first hole of the first flange;
extending the shaft through the first hole and into the second hole such that the first pusher is positioned inside the first hole and the second pusher is positioned inside the second hole;
moving the first and second pushers radially outwards from the shaft to press against an inside of the first hole and an inside of the second hole, respectively, to align the first hole with the second hole;
wherein the first flange is a lower mounting flange of an upper tower section of a wind turbine tower, and the second flange is an upper mounting flange of a lower tower section of the wind turbine tower; and
wherein the first and second holes are centering holes, and the first and second flanges further comprise fastening holes.

14. A method for aligning a first hole of a first flange with a second hole of a second flange using a device that includes a base, a retractable shaft extending from the base, and a first and a second pusher configured on the shaft, the method comprising:
attaching the base of the device to the first flange such that the shaft extends into the first hole of the first flange;
extending the shaft through the first hole and into the second hole such that the first pusher is positioned inside the first hole and the second pusher is positioned inside the second hole;
moving the first and second pushers radially outwards from the shaft to press against an inside of the first hole and an inside of the second hole, respectively, to align the first hole with the second hole;
wherein the first flange is a lower mounting flange of an upper tower section of a wind turbine tower, and the second flange is an upper mounting flange of a lower tower section of the wind turbine tower;
hoisting and positioning, using a lifting equipment, the upper tower section substantially on top of the lower tower section such that the upper mounting flange of the lower tower section is substantially aligned with the lower mounting flange of the upper tower section; and
wherein the extending of the shaft and the moving of the first and second pushers are carried out while the lifting equipment substantially supports the upper tower section; and
wherein the device is attached to the upper tower section before hoisting the upper tower section.

15. A device for aligning a first hole of a first flange with a second hole of a second flange, the device comprising:
a base;
a shaft extending from the base;
a first pusher and a second pusher configured on the shaft;
the shaft configured to move between a retracted position and an extended position where the shaft extends from the first hole into the second hole, wherein the first pusher is positioned in the first hole and the second pusher is positioned in the second hole when the shaft is in the extended position;
the first and second pushers configured to be moved radially outwardly from the shaft to exert pressure against an inner wall of the first and second holes, respectively, in the extended position of the shaft; and
wherein the first pusher and the second pusher comprise an outer surface, and wherein a coefficient of friction between the outer surface of the first pusher and the inner wall of the first hole is lower than a coefficient of friction between the outer surface of the second pusher and the inner wall of the second hole.

* * * * *